O. L. PICKARD.
AUTOMOBILE WHEEL RIM.
APPLICATION FILED DEC. 20, 1909.
1,080,580.
Patented Dec. 9, 1913.
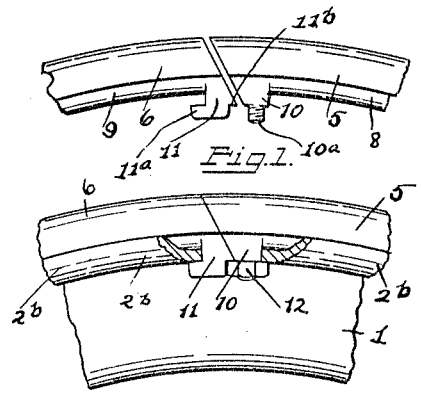
Fig. 1.
Fig. 2.
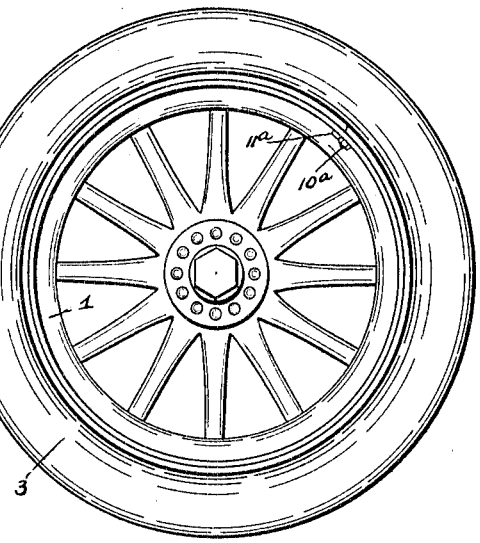
Fig. 4.
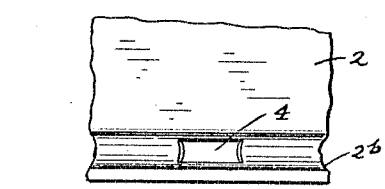
Fig. 3.
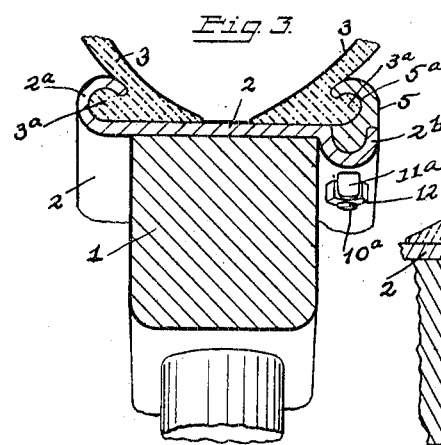
Fig. 5.
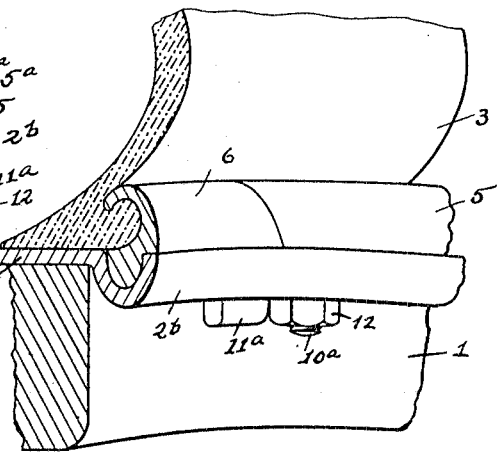
Fig. 6.
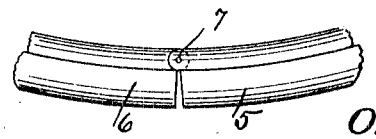
Fig. 7.
Witnesses
E. B. Maurer.
A. L. Phelps
Inventor
Orson L. Pickard
By C. C. Shepherd
Attorney

UNITED STATES PATENT OFFICE.

ORSON L. PICKARD, OF COLUMBUS, OHIO.

AUTOMOBILE WHEEL-RIM.

1,080,580.       Specification of Letters Patent.       Patented Dec. 9, 1913.

Application filed December 20, 1909. Serial No. 534,153.

*To all whom it may concern:*

Be it known that I, ORSON L. PICKARD, a citizen of the United States, residing at Columbus, in the county of Franklin and State of Ohio, have invented certain new and useful Improvements in Automobile Wheel-Rims, of which the following is a specification.

My invention relates to the improvement of automobile wheel rims of that class which are provided with what is known as quick detachable means and the objects of my invention are to provide a wheel rim construction of this class embodying improved means for securing a tire in connection therewith and for locking the tire retaining member in engagement with the rim; to provide an improved rim and tire retaining member of such construction and arrangement of parts as to admit of said retaining member being quickly detached from or attached to the rim and to provide other improvements the details of construction of which will be more fully pointed out hereinafter. These objects I accomplish in the manner illustrated in the accompanying drawing, in which—

Figure 1 is a side elevation of the adjacent end portions of the tire retaining member, Fig. 2 is a similar view of a portion of the wheel felly and rim, showing the adjoining end portions of the tire retaining member in connection therewith, Fig. 3 is a plan view of a portion of the outer margin of the rim, Fig. 4 is a view in elevation of an automobile wheel having my improved construction, Fig. 5 is an enlarged transverse section through the wheel rim and felly, Fig. 6 is a detail view in perspective of portions of the wheel rim, felly and tire, and, Fig. 7 is a side elevation of that portion of the retaining member in which is located a connecting hinge.

Similar numerals refer to similar parts throughout the several views.

1 represents the circular felly of an automobile wheel and 2 the metallic rim, which is carried on the periphery of said felly. This rim is in the nature of a flat band, the inner marginal portion of which is curved upward and inward into hook form, as shown at 2ª to engage the usual laterally projecting base portion 3ª of a pneumatic tire 3. The outer and remaining marginal portion of the rim band 2, is formed with a downwardly and thence upwardly curved or channeled member 2ᵇ, the upper side of the outer portion of which is in horizontal alinement with the upper side of the body of the rim. In the construction of the rim member 2ᵇ, I form therethrough at a suitable point an elongated opening or mortise 4.

5 and 6 represent respectively half circular or semi-ring members, two of the adjacent ends of which are suitably hinged one to the other as indicated at 7 in Fig. 7 of the drawing. The remaining ends of the members 5 and 6 which are adapted to be brought into contact with each other to result in the formation of a tire retaining ring, are formed with inclined or diagonal end surfaces, as shown. Each of these retaining or ring members has its upper and outwardly projecting portion, formed with a continuous inner side curved recess 5ª, which imparts a hook form thereto. The lower and narrower portions of the members 5 and 6, are in the nature of half round extensions of the upper portions or the bodies thereof, these rounded lower portions being indicated respectively at 8 and 9. Beneath its free end the section 5 is formed with a downwardly extending squared extension 10 which has a radial screw or threaded termination 10ª. Beneath the corresponding end of the section 6 is likewise provided a downwardly extending angular lug or projection 11, the lower horizontal arm of which is indicated at 11ª.

In utilizing my device, a tire, a portion of which is indicated at 3, is slipped over or upon the body of the rim 2 in the usual manner, one of the rounded heel projections 3ª of the tire engaging the recess of the rim hook 2ª. The tire being in this position, the sectional ring 5—6 has its inner rounded portions 8 and 9 seated in the channel of the rim member 2ᵇ in the manner indicated more clearly in Figs. 3 and 6 of the drawing. In thus seating the sectional ring, it will be understood that the angular lug 11 is first inserted downwardly through the opening 4, after which the section 6 is moved until the projecting terminal portion 11ª of the lug 11 is in engagement with the underside of the channeled member 2ᵇ of the rim. The seating of the sectional rim member in the groove or curved seat of the rim portion 2ᵇ, is continued until the projection 10 of the section 5 is in position to be pressed downward through the opening 4 at one side of the member 11 and adjacent thereto. This being accomplished and the inclined ends of the ring sections having been brought together, a nut such as is indicated at 12, is screwed on to the threaded extension 10ª of the projection 10 until said nut is in contact with the underside of said projection 10 and with the underside of a shoulder 11ᵇ of the lug 11. By thus securing the ring sections 5 and 6 in the groove or channel of the member 2ᵇ, it is obvious that the outer heel 3ª of the tire base, will be properly embraced in the recess 5ª and the tire held firmly between the parts 5 and 6 and 2ª.

It is obvious that a tire held in the manner described, may be quickly detached from the rim by withdrawing the nut 12, raising the end of the member 5 upward until its lug 10 and threaded extension are out of engagement with the member 2ᵇ, sliding the member 6 in its bearing until its projecting portion 11ª is out of engagement with the rim member 2ᵇ and moving the sections 5 and 6 outward away from each other and out of the channel 2ᵇ.

It will readily be understood that the operation of adjusting the sectional locking or retaining ring to its locked position and the removal of the same from the channel, will be greatly facilitated by the formation of the hinged joint 7 in said sectional ring at a point diametrically opposite the point of connection with the rim.

From the construction and operation described, it is obvious that by the use of the rim and tire retaining ring herein described, a tire may be readily detached from an automobile wheel rim and as readily secured in place thereon.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

What I claim, is:

An automobile wheel rim comprising a flat metal band, a peripheral hook-shaped flange on one edge of said band, an integral peripheral flange of U-shape in cross-section on its other edge and having a slot therein, a removable split hook-shaped member fitting in said last named flange, an L-shaped hook on one end of said member constructed to engage one wall of said slot, a shoulder on said L-shaped hook, a complemental shoulder on the other end of said split hook-shaped member and having a threaded extension, the meeting ends of said split hook-shaped member being beveled, and a nut for said threaded extension and adapted to bear against said two shoulders to bring the free ends of said split hook-shaped member in abutting relation.

In testimony whereof I affix my signature in presence of two witnesses.

ORSON L. PICKARD.

Witnesses:
C. C. SHEPHERD,
E. V. GRISWOLD.

Copies of this patent may be obtained for five cents each, by addressing the "Commissioner of Patents Washington, D. C."